United States Patent
Viard et al.

[11] Patent Number: 5,946,922
[45] Date of Patent: Sep. 7, 1999

[54] FOOD PROCESSING PLANT CONTROLLED ON THE BASIS OF SET-POINT PARAMETERS

[75] Inventors: Nicolas Viard, Buc; Boris Gammal, Meudon; Jean-Pierre Germain, Montigny Le Bretonneux; Sylvie Fraysse, Fontenay Aux Roses, all of France

[73] Assignee: L'Air Liquide, Societe Anonyme pour l'Etude et l'Exploitation des Procedes Georges Claude, France

[21] Appl. No.: 08/917,703

[22] Filed: Aug. 26, 1997

[30] Foreign Application Priority Data

Nov. 21, 1996 [FR] France .................. 96 14234

[51] Int. Cl.⁶ .................. F25B 49/00; G05D 23/00
[52] U.S. Cl. .................. 62/126; 62/50.2; 236/51
[58] Field of Search .................. 236/51; 62/126–127, 62/50.2, 223, 64; 165/209; 340/825.06

[56] References Cited

U.S. PATENT DOCUMENTS

| | | | |
|---|---|---|---|
| 4,726,195 | 2/1988 | Klee | 62/50.2 X |
| 4,847,894 | 7/1989 | Chanvin et al. | 379/104 |
| 4,891,952 | 1/1990 | Yoshikawa et al. | 62/157 X |
| 5,311,451 | 5/1994 | Barrett | 364/557 X |
| 5,435,147 | 7/1995 | Mochizuki et al. | 165/209 X |
| 5,460,006 | 10/1995 | Torimitsu | 62/127 |
| 5,586,446 | 12/1996 | Torimitsu | 62/126 |

FOREIGN PATENT DOCUMENTS

| | | |
|---|---|---|
| 221 618 | 5/1987 | European Pat. Off. . |
| 667 503 | 8/1995 | European Pat. Off. . |
| 723 928 | 1/1996 | European Pat. Off. . |

*Primary Examiner*—William Wayner
*Attorney, Agent, or Firm*—Burns, Doane, Swecker & Mathis, L.L.P.

[57] ABSTRACT

A food processing plant includes a food processing apparatus. The food processing apparatus including a device for setting set-point parameters for operation of the apparatus and a device for controlling operation of the apparatus based on the set-point parameters. The plant also includes a device for acquiring information relating to actual operation of the food processing apparatus, a unit for monitoring the apparatus, the unit being located remote from the apparatus and including a device for detecting anomalies in operation of the apparatus, and a device for communicating the information relating to the actual operation of the apparatus from the apparatus to the remote monitoring unit.

7 Claims, 3 Drawing Sheets

FOOD PROCESSING PLANT CONTROLLED ON THE BASIS OF SET-POINT PARAMETERS

BACKGROUND AND SUMMARY OF THE INVENTION

The present invention relates to a food processing plant, of the type including a food processing apparatus provided with means for setting set-point parameters for the operation of this apparatus and with means for controlling the operation of the apparatus on the basis of these set-point parameters.

The food processing apparatuses used in such plants are, for example, refrigerating apparatuses such as cryogenic deep-freezing tunnels or surface-crusting tunnels. These plants may also employ cooking ovens or apparatuses for dispensing precise quantities (drops) of liquid nitrogen into flexible plastic bottles before sealing, or into aluminium cans.

An example of a cryogenic tunnel for the processing of food is described in Spanish Patent Application P9500983 filed on May 23, 1995 in the name of SOCIEDAD ESPANOLA DEL OXIGENO, S.A.

The means for controlling the operation of such apparatuses on the basis of the predetermined set-point parameters may be of varying degrees of sophistication. In particular, these apparatuses may include one or more control loops acting on at least one of the set-point parameters.

Under these conditions, the complexity of the food processing apparatuses may lead to them operating imperfectly. In particular, modifications in the normal conditions in which the apparatuses are used, for example by a variation in the loading factor of the latter or a variation in the external temperature, may cause poor operation, in particular by a drift in the settings.

Thus, it is found in practice that such plants employing sophisticated actuation and control means exhibit significant risks of malfunction and of instability, which may finally lead to the fact that the observed performance is inferior to that of apparatuses of simpler design.

Over a more or less period of use, the operator of such an apparatus draws no benefit from the high theoretical performance of the apparatus that he has acquired, because of the many periods of malfunction of the latter.

Of course, these malfunctions have economic implications related, in particular, to instabilities in the quality of the products obtained, or to the erratic consumption of certain consumables, such as the liquid nitrogen used to refrigerate the food.

In this particular field of food processing, malfunctions of a processing apparatus have, in point of fact, serious consequences with regard to the quality of the processed products. Thus, when the apparatus is functioning unsatisfactorily, the processed products run the risk of being unfit for consumption and must be destroyed, thereby seriously affecting the overall productivity of the plant.

In conclusion, the food processing apparatuses, although theoretically of high performance in the absence of any disturbance, do not meet the requirements of users because of significant vagaries in their operation.

It should be noted that the owner of such plants, faced with these problems, is usually at a loss since he has only very rarely the ability to understand the phenomena involved and to bring them under control, and still less any proposals for immediately solving these problems, while potentially large quantities of products are held up, waiting until they can be processed satisfactorily.

In addition, not only does he not usually have the skill to diagnose the malfunctions of one of his apparatuses, but he may also be faced with having to tackle the problem of simultaneous malfunctions of several apparatuses (of the same or different type) on his site.

Investigations undertaken by the Applicant on this subject allow him to provide here a few illustrations of such malfunctions/drifts and of the way in which they may severely compromise the productivity of the plant.

Let us take, for example, the case of a cryogenic tunnel with control of the temperature in the tunnel, using a measurement of the temperature inside the chamber and, optionally, a feedback action, depending on the result of a comparison between the measurement and a temperature set-point value, on the setting of a cryogenic-liquid feed valve of the tunnel.

In practice, temperature drifts are observed, for example during sudden variations in the loading factor of the tunnel or in the surrounding environmental conditions. These drifts may sometimes be linked to a malfunction of the cryogenic-liquid feed valve whose curve of opening/closing over time is unable to cope with the speed which would be necessary to maintain the required temperature in the tunnel (for example, very closely separated times for opening and closing the valve, which would seriously jeopardize its future reliability).

To limit oneself in such a case to a simple measurement of the temperature would not therefore be completely representative of the actual operation of the apparatus. As developed further in the context of the present application, it is advantageous to acquire additional information which is representative of the actual operation of the apparatus, so as actually to be in a position to detect and understand possible malfunctions of and drifts in the apparatus.

The object of the present invention is to provide a solution to the problems mentioned hereinabove and, in particular, to propose a food processing plant employing a processing apparatus which is reliable and can ensure high productivity without any risk in respect of product quality.

For this purpose, the subject of the invention is a food processing plant of the aforementioned type, characterized in that it includes:

means for acquiring information relating to the actual operation of the apparatus;

a unit for monitoring the apparatus, this being located remote from the latter and designed to detect anomalies in the operation of the apparatus; and means for communicating the said information relating to the actual operation of the apparatus from the said apparatus to the said remote monitoring unit.

Depending on the particular embodiment, the plant may include one or more of the following characteristics:

the said means for communicating the said information include means for processing the said information in order to generate a message representative of the actual operation of the apparatus, and means for sending the said message to the remote monitoring unit, which unit includes means for receiving the said message and means for processing the said message for the purpose of detecting operating anomalies;

the said means for controlling the apparatus include a control loop acting on at least one of the set-point parameters;

the said control loop includes a controller associated with modifiable control parameters, the remote monitoring unit including means for generating modified control parameters, for the said controller and means for sending the said modified control parameters to the said communication means, which communication means include means for receiving the said modified control parameters sent by the said remote monitoring unit, and the said control loop includes means for modifying the control parameters on the basis of the said modified control parameters received by the said communication means from the said remote monitoring unit;

it includes means for acquiring the set-point parameters that have been set, which means for acquiring the set-point parameters are linked to the said means of communication from the said apparatus to the said remote monitoring unit for the purpose of transmitting the said acquired set-point parameters to the said remote monitoring unit;

the remote monitoring unit includes means for generating modified set-point parameters and means for sending the said modified set-point parameters to the said communication means, which communication means include means for receiving the said modified set-point parameters sent by the said remote monitoring unit, and the said means for setting the set-point parameters include means for modifying the set-point parameters on the basis of the said modified set-point parameters received by the said communication means from the said remote monitoring unit;

the said apparatus is a deep-freezing tunnel of the cryogenic type and the said information acquiring means include means for acquiring at least one of the following items of information: the temperature in the chamber of the tunnel, the quantity of cryogenic fluid consumed, the rate of outflow of vaporized cryogenic fluid and the state of operation of at least one functional device of the tunnel, in particular a valve;

the tunnel includes a conveyor for transporting the food to be processed and the said information acquiring means include a sensor for detecting movement of the conveyor; and the said apparatus is an apparatus for dispensing precise quantities of a cryogenic liquid, in particular liquid nitrogen, and the said information acquiring means include means for detecting the state of operation of at least one functional device of the apparatus, in particular a valve.

BRIEF DESCRIPTION OF THE DRAWING

The invention will be more clearly understood on reading the description which follows, given solely by way of example and with reference to the drawings in which.

DETAILED DESCRIPTION

Figure 1:
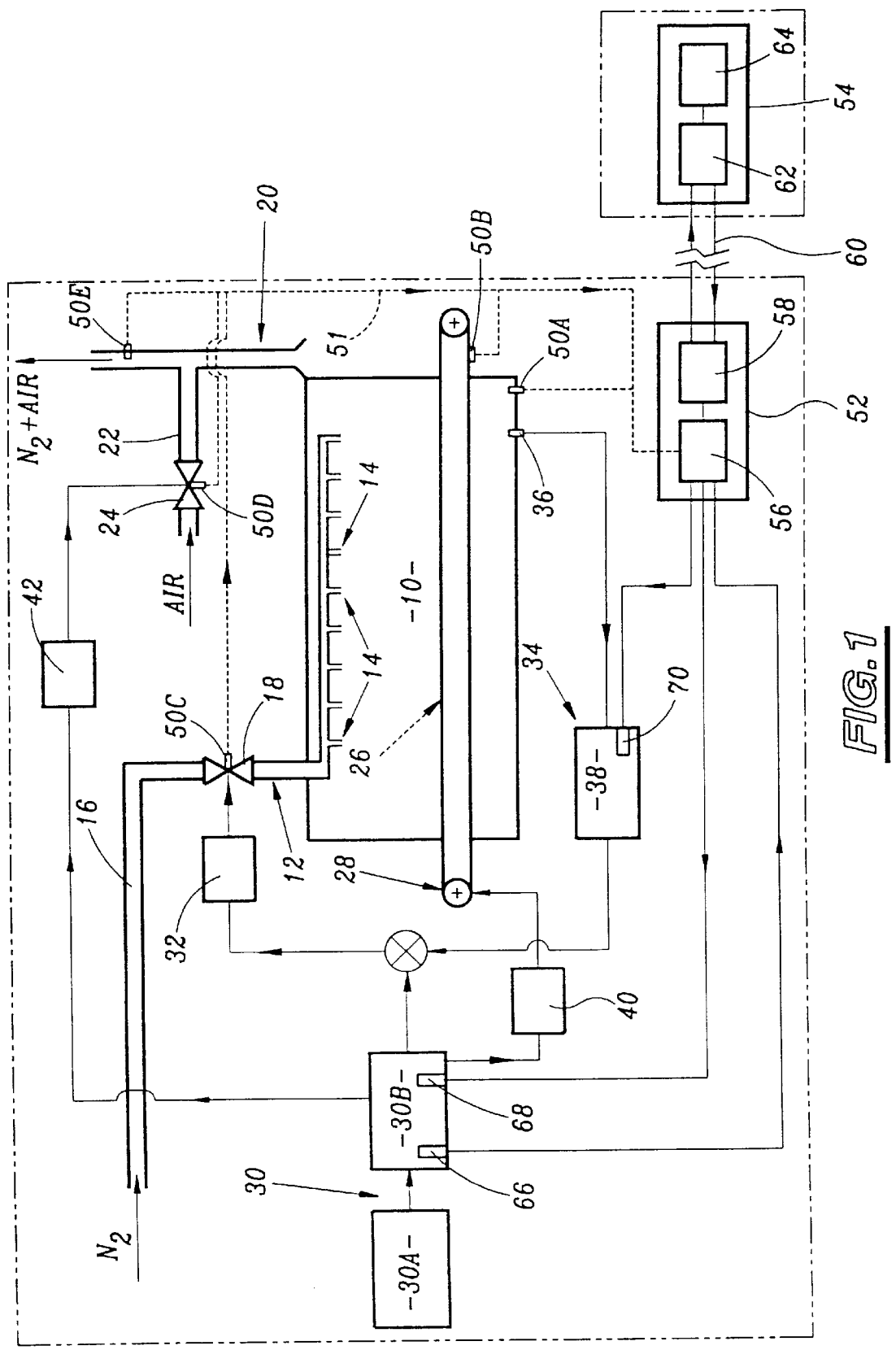
FIG. 1 is a diagrammatic view of a food freezing plant employing a cryogenic tunnel.

The food freezing plant, shown diagrammatically in FIG. 1, comprises a cryogenic tunnel 10 having more or less the same structure as the cryogenic tunnel described in Spanish Patent Application P 9500983.

Thus, the cryogenic tunnel 10 includes means 12 for feeding liquid cryogenic fluid, for example liquid nitrogen. These means include a number of injection nozzles 14 which are fed via a feed pipe 16 with cryogenic fluid. Provided on the pipe 16 is a solenoid valve 18 which controls the flow rate of nitrogen into the chamber of the tunnel.

A chimney 20 removes the cryogenic fluid vaporized in the chamber of the tunnel 10. The inlet of this chimney is located in the immediate vicinity of the tunnel. A branch connection 22 is provided on the chimney for the purpose of introducing ambient air into the latter. The branch connection 22 has a solenoid valve 24 which is designed to control the flow rate of air into the chimney. As explained in the aforementioned Spanish Patent Application, the ambient air introduced into the chimney heats the vaporized cryogenic fluid and thus prevents the water vapour present in the discharged fluid, in this case essentially coming from the surrounding air, from freezing.

It will therefore be realized that the rate of flow air into the branch connection 22 will depend on the rate of flow of atmosphere discharged, on its temperature and on its residual water-vapour content.

Moreover, a belt conveyor 26 passes all the way through the cryogenic tunnel, this belt conveyor being driven by a variable-speed electric motor 28.

The freezing plant includes user-controlled user-controlled means 30 for setting the set-point parameters, for example for controlling the temperature inside the chamber of the cryogenic tunnel and the run speed of the conveyor 26. They also enable the plant to be started and stopped.

These means 30 for setting the set-point parameters include a console 30A for setting the parameters, this being linked to control means 30B. The latter are linked to sundry means for controlling the various devices of the cryogenic tunnel.

In the case of the embodiment shown, the control means 30B are linked to means 32 for actuating the solenoid valve 18 in order to control the degree and time of opening of the valve on the basis of the set-point temperature.

Furthermore, a control loop 34 automatically controls the temperature in the chamber of the cryogenic tunnel. For this purpose, the control loop includes a temperature probe 36 located inside the chamber of the cryogenic tunnel. This probe is linked to a closed-loop controller 38 acting on the actuation means 32 so as to keep the temperature in the tunnel approximately equal to the set-point temperature.

The control means 30B may furthermore be linked to means 40 for controlling the speed of the motor 28 on the basis of the set-point speed defined on the console 30A for setting the set-point parameters.

Furthermore, the plant includes means 42 for actuating the air-inlet solenoid valve 24 in the branch connection 22. These actuation means are linked to the control means 30B, so as to control the degree of opening and the time of opening of the solenoid valve 24, on the basis of the set-point temperature. For this purpose, the control means 30B determine the flow rate of cryogenic fluid into the chamber of the cryogenic tunnel and, as indicated in the aforementioned Spanish Patent Application, calculate the degree and time of opening which are necessary in the case of the solenoid valve 24, on the basis of the flow rate of cryogenic fluid injected.

Moreover, the plant includes means for acquiring information relating to the actual operation of the apparatus.

These means bear the general reference 50 followed, in the drawings, by a letter specific to each acquiring element.

In the example shown in FIG. 1, the acquiring means include a temperature probe 50A which measures the temperature inside the chamber of the cryogenic tunnel, a sensor 50B for detecting movement of the conveyor 26, sensors 50C, 50D for measuring the opening of the solenoid valves 18 and 24 respectively, and a sensor 50E for measuring the speed of flow of the gases in the chimney 20.

All these information acquiring means are linked via a link 51, shown in dotted lines in FIG. 1, to communication means 52. These communication means are associated with the cryogenic tunnel and are designed to provide communication between the cryogenic tunnel and an off-line monitoring unit 54.

This monitoring unit, although constituting one component of the plant according to the invention, is remote from the cryogenic tunnel. It is installed, for example, in a control room of a factory, containing several monitoring units associated with separate apparatuses of similar plants, or in the premises of a company charged with the maintenance and monitoring of the cryogenic tunnel The communication means 52 include information processing means 56 linked to the information acquiring means 50. These processing means are designed to generate a message representative of the actual operation of the apparatus from the information acquired by the means 50.

The communication means 52 furthermore include, linked to the output of the processing means 56, means 58 for sending and receiving information to and from the monitoring unit 54. These sending and receiving means comprise means of connection to a data transmission line 60 formed, for example, by a telephone line or a local data transmission network.

The monitoring unit 54 includes, in a similar manner, means 62 for sending and receiving information to and from the communication means 52 associated with the tunnel. These means 62 comprise means of connection to the data transmission line 60.

The monitoring unit 54 furthermore includes information processing means 64 linked to the receiving and sending means 62. These processing means 64 are designed for processing the message representative of the actual operation of the apparatus, this message having been generated by the processing means 56 and transmitted by the complementary means 58, 62 via the line 60.

These processing means 64 include means for analysing the message representative of the actual operation of the apparatus, for the purpose, for example, of analysing the temperature detected in the chamber by the sensor 50A, the running of the conveyor 26, the state of opening of the valves 18 and 24, or the speed of flow of the gases in the chimney 20.

The analysing means are designed to detect anomalies in the operation of the apparatus, in particular by comparing the values detected by the means 50 with reference values.

The processing means 64 may be linked to means for displaying information, such as a display screen and/or a printer for the purpose of making information on the operation of the apparatus available, and for anomaly messages.

The processing means 64 may also be linked to means for sending an emergency signal to a maintenance operator. These means include, for example, a modem capable of sending the emergency signal to a portable telephone which the maintenance operator keeps on his person.

The plant also includes means 66 for acquiring the set-point parameters set by the user. These means 66 are located in the control means 30B and are linked to the information processing means 56 of the communication means 52. The latter make it possible, in particular, to transmit the set-point parameters defined on the control console 30A to the monitoring unit 54.

The processing means 64 of the monitoring unit for their part include means for determining modified set-point parameters. The control means 30B include means 68 for modifying the set-point parameters on the basis of the modified set-point parameters generated by and sent from the monitoring unit 54 to the cryogenic tunnel. For this purpose, the means for modifying the set-point parameters are linked to the processing means 56 of the communication means 52 associated with the cryogenic tunnel.

Likewise, the processing means 64 of the monitoring unit include means for generating modified control parameters.

The controller 38 includes means 70 for modifying the control parameters, these means being linked to the processing means 56 so as to modify the parameters of the controller on the basis of the modified control parameters generated by and transmitted from the monitoring unit 54.

An example showing the operation of the plant will now be described.

The cryogenic tunnel user sets the tunnel operation set-point parameters from the console 30A for setting the parameters, this console being located near to the tunnel. In particular, he determines, on the basis of the products to be frozen and on the productivity factor which he wishes to achieve, the temperature inside the chamber of the cryogenic tunnel and the speed at which the conveyor 26 is to run. Based on these set-point parameters, the control means 30B control, entirely or partly, the actuation means 32, 40, 42, so that the latter actuate, respectively, the solenoid valve 18, the motor 18 and the solenoid valve 24 according to algorithms, which will not be described in detail here.

During the operation of the plant, the control loop 34 controls the temperature inside the cryogenic tunnel.

In addition, according to the invention, during the operation of the plant, for example at regular or defined time intervals, information relating to the actual operation of the apparatus, via 50A to 50E, are detected and transmitted to the monitoring unit 54. Likewise, the set-point parameters imposed by the tunnel user are acquired by the means 66 for acquiring the set-point parameters and are transmitted to the monitoring unit 54.

The processing means 64 determine, from the analysing means which they contain, whether the operation of the tunnel is normal or not. If an operating anomaly is detected, from analysis of the information acquired from cryogenic tunnel, the processing means 64 determine what action should be taken.

By way of illustration, anomalies may be detected by tracking over time (curve of variation) the information acquired by the sensor 50C, giving the frequency and duration of opening of the valve 18.

Again by way of example, the analysing means may compare the quantity of cryogenic fluid consumed in the tunnel with a consumption value established initially when designing the plant. For this purpose, a meter, not shown, is placed on the pipe 16, for example. This meter is linked to the communication means 52 for the purpose of transmitting the quantity of cryogenic fluid consumed to the tracking unit 54.

In the course of monitoring the anomalies, if for example the temperature detected by the probe 50A inside the chamber is very different from the set-point temperature, the processing means 64 generate modified control parameters and send them to the controller 38, so as to modify the control parameters employed. The controller is thus modified so as to allow effective tracking of the set-point temperature.

Still by way of example, if the curve of opening and closing of the valve 18 with time, as produced by the unit 54, is erratic, the unit will be able to take several types of action (depending on the site in question, the products processed, etc.), ranging from sending to the user site an (on-console textual, visual, audible, etc.) warning message to arranging for a maintenance operator to be sent to the cryogenic tunnel in order to carry out maintenance or repair operations, or will generate modified set-point parameters for operating the valve 18 (for example, one which is more representative of the suddenly modified load factor of the tunnel), which modified parameters are sent to the communication means 52 of the tunnel, or alternatively, still by way of illustration, an intentional action of stopping the supply to the tunnel of products to be processed.

Under certain conditions, an operator present at the monitoring unit may therefore, after analysing the actual operation of the cryogenic tunnel, modify one or more of the set-point parameters thereof. For this purpose, the processing means 64 generate, as mentioned above, under the control of the operator, modified set-back parameters which are sent via the transmission line 60 to the communication means 52 of the cryogenic tunnel. The processing means 56 then actuate the set-point parameter modification means 68 in order to modify these parameters.

It will be understood that, depending on the case in question, any type of information relating to the actual operation of the cryogenic tunnel may be remotely tracked, and therefore assessed and diagnosed, from the monitoring unit. Thus, it is possible to detect an operating anomaly in the cryogenic tunnel very rapidly (or even several simultaneous anomalies on several apparatuses) before this operating anomaly becomes prejudicial to the food being processed by the tunnel or to the tunnel itself (for example, prejudicial to the lifetime of a valve).

It will be realized, too, that a great variety of 4malfunctions may thus be detected and diagnosed, a few examples of which, in addition to those already mentioned, will be given below:
- a temperature drift;
- jamming of the belt;
- a blockage of the chimney;
- a drift in the frequency and duration of opening of the valves 18 and 24 (a sign, for example, that the valve 18 cannot keep to the set-point frequency of opening which has been imposed on it by the control means 30B).

Moreover, it will be noted that it is possible, from the remote monitoring unit, to carry out invoicing operations or management operations with regard to the output of the cryogenic tunnel, insofar as the information transmitted from the cryogenic tunnel to the monitoring unit may include quantitative indications regarding, for example, the quantity of products processed by the tunnel or the quantity of cryogenic fluid consumed.

Other information regarding the tunnel may be acquired, transmitted to the monitoring unit and stored for the purpose of, e.g., statistical analysis. This may include, for example, the duration of actual operation of the tunnel, the duration of its intentional stoppages and the duration of its stoppages caused by a breakdown.

Figure 2:
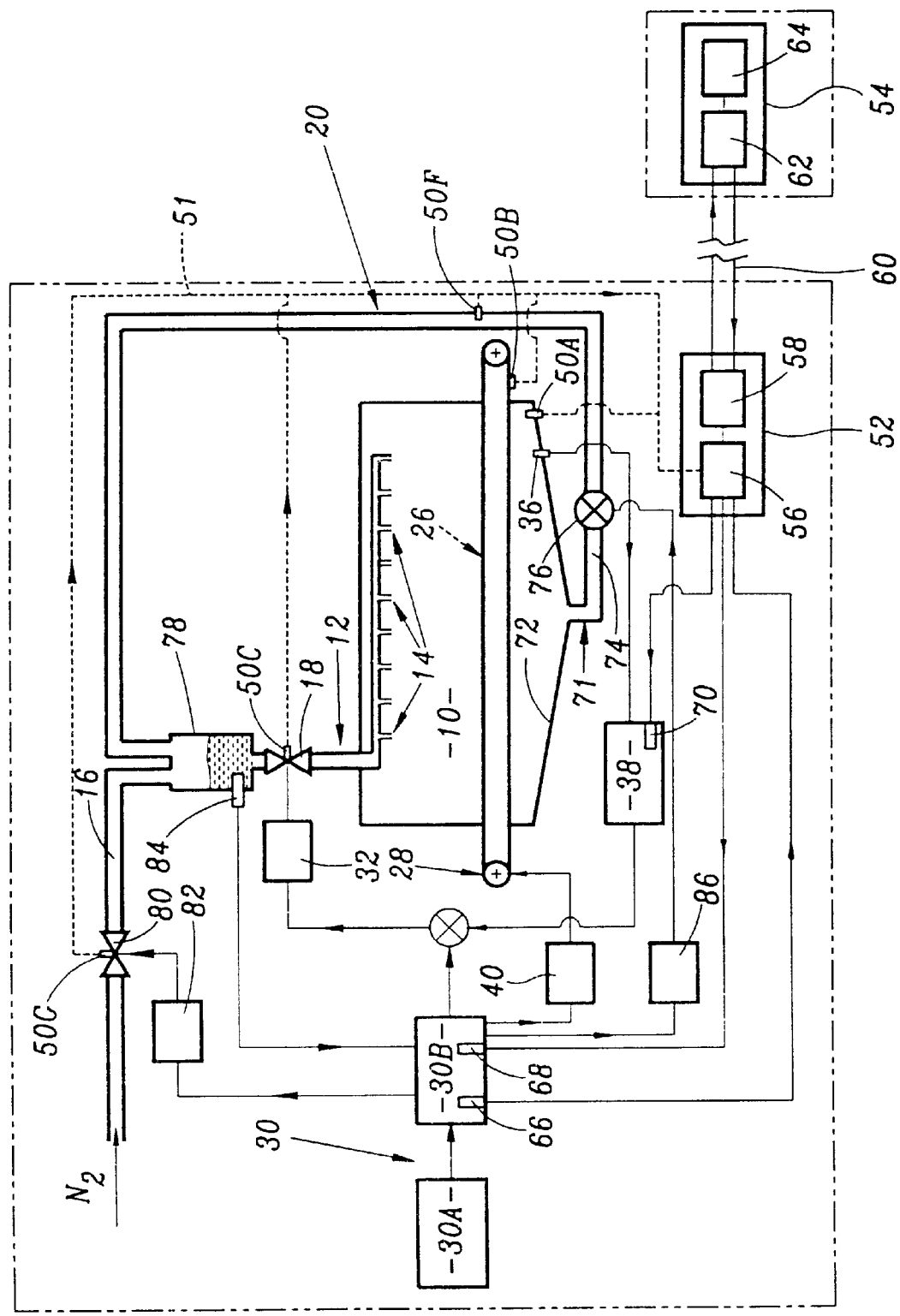
FIG. 2 is a plant for forming a surface crust on food, employing a cryogenic surface-crusting tunnel.

FIG. 2 shows a plant for forming a surface crust on products. This plant is substantially similar to that shown in FIG. 1. Components which are identical or similar to those in FIG. 1 therefore bear the same references.

In order not to clutter up the figure, the chimney 20 and its entire associated control environment have been omitted in order better to present and display other specific components of this surface-crusting plant, which have been added.

The algorithms for controlling and feeding the tunnel with cryogenic fluid are, in this case, different, the sole function of the tunnel being to freeze the surface of the food introduced. These algorithms, which may be of any suitable known type, will not be described in detail here.

In particular, means 71 for collecting the excess liquid cryogenic fluid are provided in the bottom part of the chamber of the cryogenic tunnel. For this purpose, the bottom 72 of the tunnel is in the form of a funnel converging towards a pipe 74 for recovering the excess cryogenic liquid. A pump 76 is provided on this pipe 74 so as to send the excess cryogenic liquid to a buffer tank 78 located on the pipe 16 upstream of the solenoid valve 18. A solenoid valve 80, linked to the control means 30B via actuation means 82 intended to open the solenoid valve, is located on the pipe 16 upstream of the buffer tank 78. Furthermore, a low-level sensor 84 is integrated in the buffer tank 78. This sensor is connected to the control means 30B so as to open the solenoid valve 80 when the level in the buffer tank 78 is below a predetermined level.

Moreover, the pump 76 is linked to the control means 30B via means 86 for operating the pump.

In this embodiment, a sensor 50F for detecting flow in the pipe 74 is provided downstream of the pump 76. Likewise, a sensor 50G is associated with the solenoid valve 80 so as to check that it is operating correctly. As before, the sensors 50F and 50G are linked to the information processing means 56 for the purpose of transmitting a message representative of the state of actual operation of the surface-crusting tunnel to the monitoring unit 54.

As in the previous embodiment, the actual operation of the surface-crusting tunnel may thus be remotely tracked for the purpose of rapidly implementing corrective actions in the event of a malfunction which may impair the quality of the processed food and the integrity of the constituent components of the plant.

In addition to the quantities tracked, and if necessary corrected, from the monitoring unit, which are identical to those in the plant of FIG. 1, the plant described here allows remote tracking of the correct operation of the feed valve 80 and of the circuit for regenerating the excess liquid cryogenic fluid.

Figure 3:
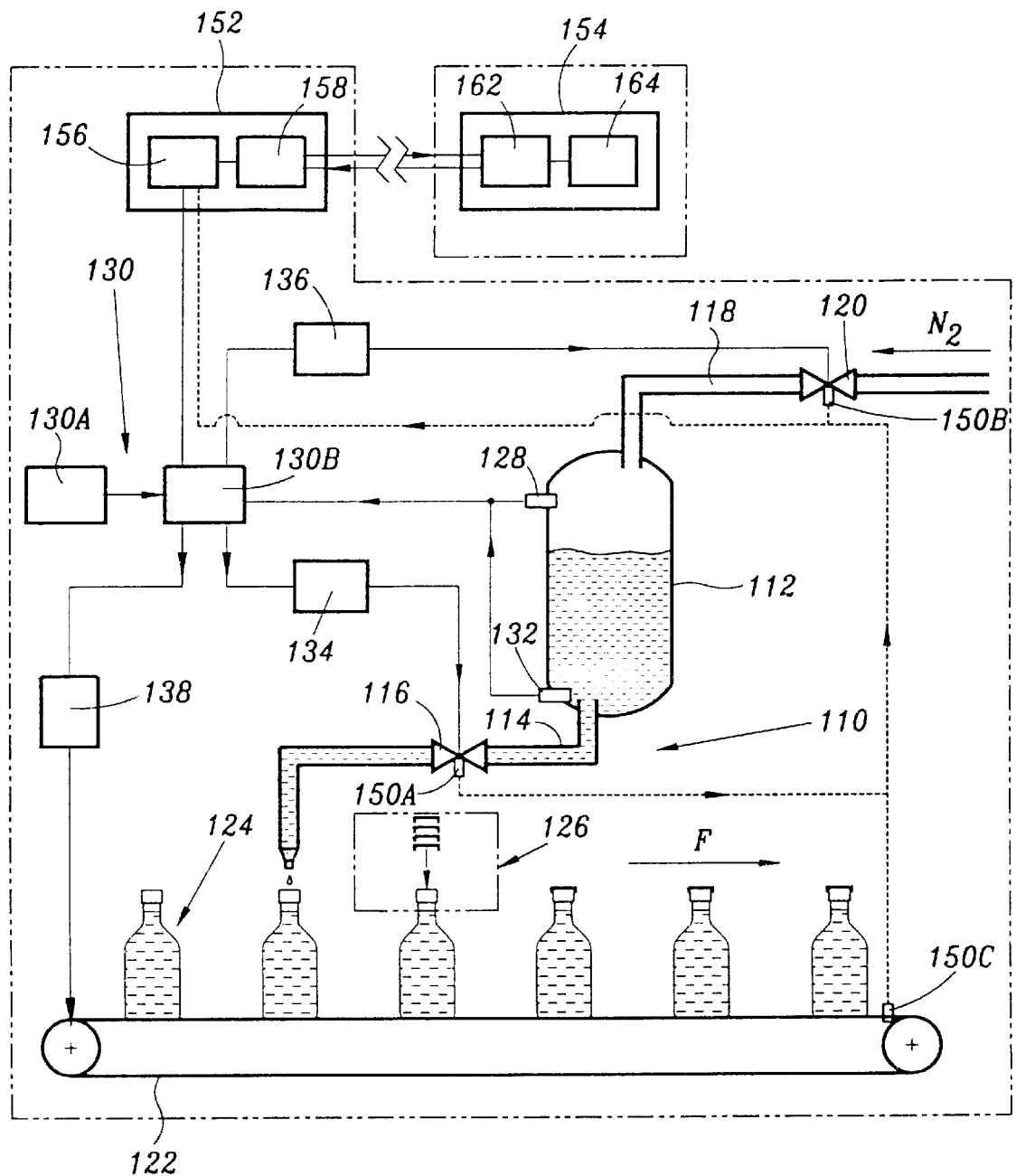
FIG. 3 is a diagrammatic view of a plant for bottling a non-fizzy drink, employing a device for dispensing precise quantities (drops) of liquid nitrogen into each bottle before sealing it.

FIG. 3 shows another example of a food processing plant employing a remote tracking unit.

In this plant, elements similar to those in FIGS. 1 and 2 are denoted by the same references, plus 100.

In this embodiment, the food processing apparatus is formed by a device 110 for dispensing drops of cryogenic liquid, in this case liquid nitrogen.

This device includes a buffer tank 112 for temporarily storing the liquid nitrogen, and a pipe 114 for dispensing the drops of liquid nitrogen. This pipe 114 is provided with a solenoid valve 116 which ensures sequenced dispensing of drops of liquid nitrogen.

The tank 112 is fed via a pipe 118 linked to a liquid nitrogen storage tank. A solenoid valve 120 is located on the pipe 118 in order to control the filling of the buffer tank 112.

The device for dispensing drops of liquid nitrogen is associated with a conveyor 122 for transporting plastic bottles (or other aluminium cans) 124 which have been filled beforehand with a non-fizzy drink. The conveyor moves along the direction of the arrow F. Immediately prior to the application of a seal in a sealing unit 126, a precise quantity of liquid nitrogen is poured into each bottle, so as to form therein an inert gaseous cover but also to increase the pressure in the bottle.

As in the previous embodiment, the plant includes a console 130A for setting the set-point parameters and means 130B for controlling the plant. These control means are linked to two sensors 128, 132 which are provided in the buffer tank 112 so as, respectively, to detect a high level and a low level of liquid nitrogen.

Furthermore, actuation means 134, 136, 138 are linked to the control means 130B so as to actuate, as required, the solenoid valves 116, 120 and the motor for the conveyor 122, respectively.

The control means 130B are designed to open the solenoid valve 120 when a low level is detected in the tank 112 by the low-level detector 132 and to close the solenoid valve 120 when a high level is detected in the tank 112 by the high-level detector 128.

In addition, the control means 130B are designed to open the valve 116 for the purpose of releasing a quantity of liquid nitrogen into each bottle 124, under the dispensing end of the pipe 114, at a rate synchronized with the movement of the bottles. Thus, the rate of opening of the valve 116 is computed from the speed of the conveyor 122. In such a plant, the set-point parameters may be, for example, a curve for the opening/closing of the valve 116 as a function of the speed of movement of the conveyor.

As in the previous embodiments, the control means 130B are linked to communication means 152 which are themselves linked to a remote monitoring unit 154.

Moreover, sensors 150A, 150B and 150C are respectively associated with the solenoid valves 116 and 120 and with the conveyor 122, so as to check that these are operating properly. These sensors are linked to the communication means 152 so as to allow remote detection of anomalies in the operation of the apparatus (for example, by means of the sensor 150A, erratic operation of the valve 116).

Other sensors may be provided on the liquid nitrogen dispenser so as to check that it is operating correctly, or to allow tracking of the production of the dispenser. For this purpose, means for detecting the number of bottles 124 moving along the conveyor 122 may be employed. These means are linked to the communication means 152 for the purpose of transmitting the number of bottles filled to the monitoring unit.

It will therefore be appreciated, given all the examples detailed above, that, in a very general manner, food processing plants which include a remote monitoring unit according to the invention, which unit works by acquiring information representative of the actual operation of the plant, make it possible to operate processing apparatuses, in particular sophisticated and complex processing apparatuses, without any risk to the food processed in the event of malfunction of the apparatus. In particular, the apparatuses employed may then include much less elaborate control loops, since any malfunctions may be detected and assessed rapidly and the appropriate corrective measures may be taken without delay, so as to safeguard the quality of the processed food.

Of course, the information tracked remotely from the monitoring unit may also be directly accessible at the apparatus in question, this information being, for example, displayed on a screen.

We claim:

1. A food processing plant, comprising:

a food processing apparatus, the food processing apparatus including means for setting set-point parameters for operation of the apparatus and means for controlling operation of the apparatus based on the set-point parameters;

means for acquiring information relating to actual operation of the food processing apparatus;

a unit for monitoring the apparatus, the unit being located remote from the apparatus and including means for detecting anomalies in operation of the apparatus; and means for communicating the information relating to the actual operation of the apparatus from the apparatus to the remote monitoring unit, wherein the apparatus is a cryogenic type deep-freezing tunnel and the information acquiring means includes means for acquiring at least one of a temperature in a chamber of the tunnel, a quantity of cryogenic fluid consumed, a rate of outflow of vaporized cryogenic fluid and a state of operation of at least one function device of the tunnel.

2. Plant according to claim 1, wherein the tunnel includes a conveyor for transporting food to be processed and the information acquiring means includes a sensor for detecting movement of the conveyor.

3. Plant according to claim 1, wherein the at least one function device is a valve.

4. A food processing plant, comprising:

a food processing apparatus, the food processing apparatus including means for setting set-point parameters for operation of the apparatus and means for controlling operation of the apparatus based on the set-point parameters, means for acquiring information relating to actual operation of the food processing apparatus;

a unit for monitoring the apparatus, the unit being located remote from the apparatus and including means for detecting anomalies in operation of the apparatus; and means for communicating the information relating to the actual operation of the apparatus from the apparatus to the remote monitoring unit, wherein the apparatus is an apparatus for dispensing precise quantities of a cryogenic liquid, and the information acquiring means includes means for detecting a state of operation of at least one functional device of the apparatus.

5. Plant according to claim 4, wherein the cryogenic liquid is liquid nitrogen.

6. Plant according to claim 5, wherein the at least one functional device is a valve.

7. Plant according to claim 4, wherein the at least one functional device is a valve.

* * * * *